Figure 1:
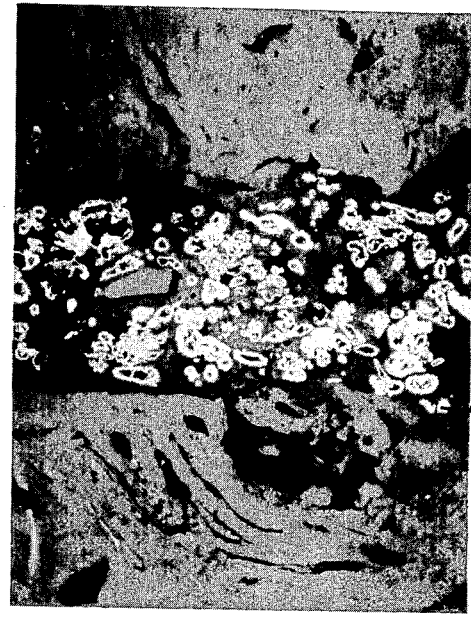

United States Patent
Kellar

[15] 3,657,592
[45] Apr. 18, 1972

[54] ELECTRODE JOINT CEMENT

[72] Inventor: Arnold Arbuthnot Kellar, Columbia Station, Ohio

[73] Assignee: Union Carbide Corporation, New York, N.Y.

[22] Filed: Apr. 22, 1970

[21] Appl. No.: 30,769

[52] U.S. Cl. ................................313/357, 13/18, 156/155, 156/335, 287/127 E, 313/332, 313/354
[51] Int. Cl. ............................................................C09j 5/00
[58] Field of Search ..............313/332, 334, 354, 357; 13/18; 287/127 E; 156/155, 335

[56] References Cited

UNITED STATES PATENTS 3,429,759  2/1969  Kellar et al. ............................156/155

Primary Examiner—David Schonberg
Assistant Examiner—Paul A. Sacher
Attorney—Paul A. Rose, Robert C. Cummings, John S. Piscitello and Cornelius F. O'Brien

[57] ABSTRACT

A high temperature cement, comprising elemental powders of boron and a transition metal and a carbonizable binder, is provided for joining sections of a carbonaceous electric-furnace electrode column. The cement is initially heated to between about 90° C. and 130° C. to thermoset the carbonizable binder and then the temperature is elevated to above 1,000° C. to react the transition metal with the boron to form a strong cemented bond having excellent thermal and electrical properties.

7 Claims, 2 Drawing Figures

TITANIUM DIBORIDE

ELECTRODE JOINT CEMENT

FIELD OF THE INVENTION

This invention relates to a high temperature cement for joining carbonaceous articles and more particularly to a cement for use in joining sections of an electric furnace electrode column which retains its electrical and mechanical strength when exposed to high temperature environments.

DESCRIPTION OF THE PRIOR ART

Graphite electrodes, as used in electric furnaces and like equipment, are consumed in use and therefore must be fed into a furnace continuously if the furnace is to operate without interruptions. In order to facilitate this continuous feed, the electrode sections are usually joined at their end faces during the operation of the furnace. In this manner, the end face of a new electrode can be joined to the end face of an electrode being consumed thereby providing a continuous feed operation.

The common or contact area between the end faces of the electrode sections is referred to as the electrode joint and the overall joined electrode sections is referred to as the electrode column.

Various methods for joining electrode sections have been devised of which the threaded nipple connection is the most popular. Although many ways are available for effecting an electrode joint between two electrode sections, a major problem still prevailing in the electrometallurgy industry is the fact that sometimes the electrode joint has a tendency to crack and even rupture during use. This cracking or breaking at the electrode joint may be caused by stresses set up by vibrations, thermal and mechanical shock or other causes.

When employing the threaded nipple connection technique, it has been found that the large tolerance prevailing in the fabrication of the nipple and in the machining of the female recess in the electrode sections result in less than half of the nipple's cylindrical surface being in contact with the corresponding surface of the electrode sections. In addition, a substantial portion of the end faces of mating electrode sections do not make good electrical contact when joined together. This large non-contacting surface area presents a very poor conductance path for the current flow through the electrode column and results in the setting up of temperature gradients across the cross-section of the joint.

Since it is known that materials have different coefficients of expansion, the nipple and the electrode sections expand different amounts when exposed to the high operating temperatures of the electric furnace and thereby cause corresponding thermal stress build up which sometimes causes cracks, splits and even rupture of the joint.

In addition to possible splits and even rupture of the joint, the non-contacting surface area between electrode end face sections and between the nipple and electrode sections cause a higher resistance at the joint than at other points along the electrode column. This increased resistance at the joint causes electrical power to be consumed in the form of wasted heat during the operation of the furnace thus decreasing the efficiency of the electrometallurgical process being performed.

Of additional interest is the fact that the mechanical strength of threaded nipple joints depends primarily on the mechanical properties of the threaded nipple. The flexural strength of such a joint connection is relatively weak and when the joint connection is exposed to the high temperatures which exist in electric furnaces, the end faces of the electrode sections usually separate at the joint causing the relaxation of the surface-to-surface contact thereby aggravating the problems associated with the non-contacting surface area of the joint. To remedy this situation of weak flexural strength and non-contacting surface area of the joint, it has been proposed to use threaded nipples containing reservoirs of pitch as the connecting means for electrode sections. As described in U. S. Pat. No. 2,828,162, a pitch reservoir, containing a bonding material, is located adjacent each end of a nipple so that when the electrode sections are joined and heated, the bonding material will melt and be forced to substantially fill a preselected area of the total threaded surface.

Another remedy proposed to alleviate the problem of having a large non-contacting surface area between the electrode sections and the nipple is to have the screw threads of the nipple coated with a metal. By doing this, the conductivity would increase since the metal is usually more conductive than the carbon on which it is coated. However, when the electrode joint so formed is heated, the metal melts and sometimes flows away from the screw threads leaving the joint with slight spaces between the nipple and electrode sections.

A recently issued U. S. Pat. No. 3,429,759, discloses another remedy for the problem of having a non-uniform electrical resistance along the length of an electrode column and specifically across the electrode joint of the column. The crux of the disclosure is in the use of a high temperature cement, composed of prereacted titanium diboride powder mixed with a carbonizable binder, on the end faces of electrode sections to be joined. The cement, after being properly cured, provides a relatively good bonding means for the electrode sections. However, the present invention provides a high temperature cement for joining electrode sections that increases the flexural strength of the electrode joint over that obtainable by use of the above-identified cement while substantially improving the uniform thermal and electrical properties across the joint of the electrode column.

SUMMARY OF THE INVENTION

The invention comprises a high temperature thermosetting cement for use in joining electric-furnace electrodes which comprises elemental powders of boron and a transition metal mixed with a carbonizable binder, such transition metal being one of those in the periodic table belonging to Groups IV, V and VI, e.g. titanium, zirconium, hafnium; vanadium, niobium, tantalum; and chromium, molybdenum and tungsten, respectively. Specifically, the exothermic reaction between a transition metal, like titanium, and boron, when heated to above 1,000° C. to produce titanium diboride, engenders sufficient heat to aid in the diffusion or penetration of the titanium diboride into the graphite sections being bonded thereby providing a much stronger bond therebetween. The flexural strength of the joint so formed is comparable to or greater than that of the graphite base material and the conductance across the joint is greatly increased so as to provide uniform thermal and electrical properties throughout the electrode column. This increase in conductance decreases the high temperature gradients normally developed in the end faces of the electrode sections of the joint thus greatly reducing the likelihood of cracks and splits being formed thereat. Since these cracks and splits are usually aggravated during their movement toward the tip of the electrode, and sometimes even result in the complete fracture of the joint, their substantial elimination results in an optimum economical use of the electrode column in electrometallurgical processes.

The essential components of this high temperature thermosetting cement is the elemental powders of boron and the transition metal. The size of the particles of the powder is variable with the maximum size depending on the thickness of the cemented joint formed. However, a particle size less than about 74 microns is preferable. The ratio of boron to the transition metal can vary between 9:1 and 1:9 depending upon the exact set of properties desired at the joint area although a ratio between about 3:2 and 2:3 is preferred. For example, a titanium rich cement composition results in the highest tensile strength obtainable while providing the highest resistance across the joint. A boron rich composition provides no apparent resistance drop across the joint while the tensile strength thereat is less than that obtainable from a titanium rich composition. It is believed that boron in excess of the amount stoichiometrically required for its reaction with titanium to produce titanium diboride, will aid diffusion of the reacting cement into the substrate thus partially accounting for the lower resistance across the cemented joint and the increased bond strength thereof.

Preferably, a thermosetting carbonizable binder, employed as a low temperature curable vehicle, is added to the cement composite in a range of from about 35 to about 120 parts by weight per 100 parts by weight of the dry powder composite. This will allow the cement to precure at a relatively low temperature whereby the activation of the binder will produce a good bond for the electrode sections being joined. This bond will maintain the end face surfaces of the electrode sections in good contact while the temperature can be elevated to activate the boron and transition metal reaction. Some well known low temperature carbonizable binders include furfural, furfuryl alcohol, Varcum (prepolymerized furfuryl alcohol) with a suitable catalyst, phenol furfural, phenol formaldehyde resins, various mixtures thereof, and any solvent capable of plasticizing phenol base resins.

Filler material, such as particulated carbon, may be added to the cement composite in a range up to about 20 parts by weight per 100 parts by weight of the dry powders. This particulated carbon additive is especially desirable when excess boron is present in the cement composite so that the fine particles of carbon will be available to facilitate the concentrated deposition of reprecipitated graphite at the electrode end faces of the joint when minimum resistance across the cemented joint is required.

A low viscosity oil may be added to the cement components in an amount of up to about 5 parts by weight of the dry powders so that during initial heating of the cement, the bleeding of the oil will create interconnecting pores to be used by the escaping volatiles from the carbonizable binder. This will reduce the possibility of cracking at the vicinity of the joint sometimes caused by the escaping volatiles from the binder.

A silicon additive, having particles sizes less than about 250 microns, may be incorporated into the cement mix so as to convert to silicon carbide above 1,500° C. The silicon carbide so formed, aids in the retardation of oxidation of the bonded joint when the joint is exposed to the high temperatures which exist in electric furnaces. The ratio of silicon could be up to about 10 parts by weight per 100 parts by weight of the dry powder composite.

To obtain the preferred embodiment of the invention, the cement, comprising powders of boron and a transition metal, such as titanium, mixed with a low temperature thermosetting carbonizable binder, is applied to at least one surface of the carbon or graphite sections to be joined by any known method as painting, spraying, dipping, etc. The thickness of the cement layer is somewhat critical and flexural strength comparable to or greater than that of a graphite base stock have been obtained from cement joints of less than about 0.005 inch to about 0.015 inch thick. Moreover, joint thickness of less than about 0.030 inch is deemed necessary to maintain a strong cemented joint for electrode sections.

The assembled opposed end faces of the carbon or graphite sections are precured from about 90° C. to about 130° C. for a time period depending on the binder used and exact temperature maintained. For example, a cement containing a low temperature carbonizable binder will thermoset in less than 4 hours at 90° C. and in only 10 minutes or less at 130° C. When desired, flash curing a binder in a cemented joint in about 30 seconds can be accomplished by using constituents such as Varcum and a suitable catalyst in the binder and then exposing the cemented joint to temperatures up to about 500° C.

The portion of the thus joined members are heated to a temperature of about 1000° C. wherein the reaction of the transition metal with the boron starts to occur and at about 1500° C. this reaction is fairly complete. For example, when using titanium as the transition metal, the localized exothermic heat of the titanium diboride reaction is sufficient to assist in the substantial diffusion of the reactants into the substrate thereby resulting in a strong bond between the cement and the carbon or graphite sections.

Figure 2:
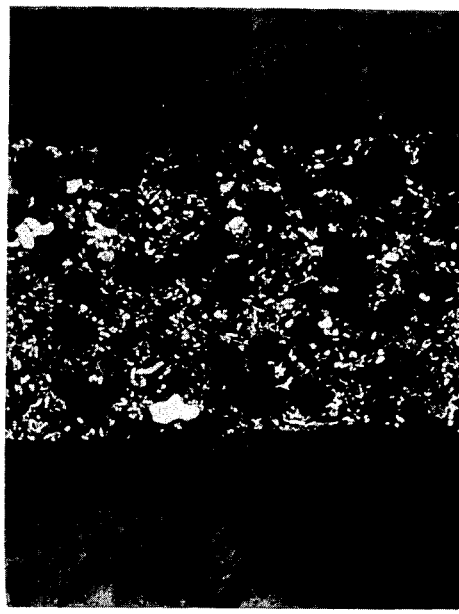

This diffusion of the reactants into a graphite electrode is visually demonstrated by comparing FIG. 1, which shows an electrode joint prepared from a titanium-boron cement composite according to this invention, with FIG. 2 which shows a similar electrode joint except that the cement used was prepared according to U. S. Pat. No. 3,429,759. Note the penetration of the white particles of titanium diboride into the graphite base stock in FIG. 1, thereby disfiguring the line of demarcation between the cement and the graphite while in FIG. 2 the demarcation line between the cement and the graphite is distinctly shown. It is this penetration of the titanium diboride that partially accounts for the superior bonded joint between the electrode sections. In addition, the void spaces indicated by black areas in the cemented joint are larger and more numerous in FIG. 2 that in FIG. 1 thus visually indicating the stronger bond obtained by using the cement of this invention.

It is also possible to effect a good cemented bond for graphite or carbon articles by using the elemental powders of the transition metal and boron alone. In practice, the powders of the transition metal and the boron are applied between the carbon or graphite sections to be joined and then while maintaining sufficient pressure to insure contact between such surfaces, the thus joined sections are heated to above 1,000° C.

EXAMPLE 1

Two-inch diameter sample cores, drilled from a 24-inch diameter graphite stock, were cut to 4 and 6 inch lengths and machined with matching 45° conical end faces. With the end faces moisture free, various composites of cement, listed in Table I, including the high temperature cement disclosed in U. S. Pat. No. 3,429,759, (Cement A), were applied to the male end of the core samples with a spatula and then each core was assembled with its female mating part with just enough manual pressure to cause the cement to extrude around the periphery of the joint. Average thickness of the cemented joints so formed was 0.010 inch. Each assembled core specimen was placed vertically in an oven and heated at 100° C. for 2 hours to thermoset the binder. The specimens were then packed in coke and baked in an induction heated furnace at 500° C. per hour to 1,500° C. The specimen containing cement G was heated to 2,000° C. so that the added ingredient of silicon could form silicon carbide. The specimens were then cooled to room temperature and subjected to a flexural strength test employing a four-point loading system.

TABLE I

High Temperature Cement Composites; A Through G
[The weight of each component is expressed in parts by weight per 100 parts by weight of the total cement]

|  | A | B | C | D | E | F | G |
|---|---|---|---|---|---|---|---|
| TiB$_2$ | 67.1 | | | | | | |
| Titanium/44 micron size | | 30.2 | 28.18 | 29.83 | 34.83 | 34.43 | 31.11 |
| Boron amorphous | | 20.4 | 19.06 | 20.17 | 23.30 | 23.05 | 21.05 |
| Thermax | | 7.6 | 7.06 | 7.47 | | | |
| Silicon less than 250 microns | | | | | | | 5.99 |
| Phenol | 15.8 | 20.9 | | 20.69 | 20.93 | 20.69 | 20.93 |
| Furfural | 7.9 | 10.45 | | 10.345 | 10.47 | 10.35 | 10.47 |
| Furfuryl alcohol | 7.9 | 10.45 | 3.91 | 10.345 | 10.47 | 10.35 | 10.47 |
| Stearic acid | 1.3 | | | | | | |
| Oil | | | | | 1.15 | | 1.15 |
| Varcum | | | 39.09 | | | | |
| Maleic anhydride | | | 2.70 | | | | |

Four samples of each cement joint A through G, each employing the cement composites A through G, respectively, were subjected to the flexural strength test. The average flexural strength applied prior to failure of each set of four samples was ascertained and is shown in Table 2. In addition, the location of failure in the samples is also specified.

TABLE 2

Cemented Joints A Through G

[The flexural strength of each joint of 4 samples is expressed in pounds per square inch]

|  | A | B | C | D | E | F | G |
|---|---|---|---|---|---|---|---|
| Maximum | 1,310 | 2,050 | 1,871 | 1,610 | 1,934 | 1,804 | 1,693 |
| Minimum | 710 | 1,591 | 1,327 | 1,413 | 1,618 | 1,731 | 1,396 |
| Average | 963 | 1,763 | 1,645 | 1,504 | 1,817 | 1,769 | 1,530 |
| Failure | (1) | (2) | (3) | (4) | (3) | (4) | (2) |

1 Joint (4 samples).
2 Stock (4 samples).
3 Stock (2 samples), Stock and Joint (2 samples).
4 Stock (3 samples) Stock and Joint (1 sample).

Comparing the results of the various cemented joints prepared according to this invention (B through G) with the cemented joint prepared according to U. S. Pat. No. 3,429,759 (A), we see that the cemented joints B through G withstood a much higher flexural strength than cemented joint A. In addition, cemented joint A failed at the joint area while cemented joints B through G failed primarily at the stock portion of the graphite core. Thus we see the flexural strength across the cemented joints B through G compare favorably with the base stock.

An electrical resistance measurement taken across the cemented joints of all samples compared closely to that obtained for the base stock.

A highly preferred cement mix for use in joining electrode sections would comprise about 50.5 parts by weight elemental titanium and boron powders per 100 parts by weight of the cement wherein the titanium to boron ratio is about 3:2; about 42 parts by weight of a carbonizable binder per 100 parts by weight of the cement and about 7.5 parts by weight of particulated carbon per 100 parts by weight of the cement. The carbonizable binder would comprise about 21 weight per cent phenol, about 10.5 weight per cent furfural and about 10.5 weight per cent furfuryl alcohol.

The cement can also be applied to at least one side of any non-metallic, non-refractory textile material instead of, or in addition to, applying the cement to at least one end face of the electrode sections of an electrode joint without substantially effecting the flexural strength of the electrode. This textile material may be woven, knit or felt fabric which acts as a vehicle for applying the cement and which is assembled between the electrode sections.

EXAMPLE 2

A test was conducted on samples of 2 inch cores identical to those identified above. Instead of applying cement directly to the end faces of the cores only, the cement was first applied to an open piece of circular cheese cloth and then to the end faces of the cores. The cores were then joined with sufficient manual pressure to cause the cement to extrude around the periphery of the joint. The average thickness of the cemented joint, including the cheese cloth, was 0.010 inch. The thus joined cores were heated at 100° C. for 2 hours and then baked in an induction heated furnace at 500° C. per hour to 1,500° C. The core joints were then cooled to room temperature whereupon they were then subjected to a flexural strength test as described above. The results so obtained are tabulated in Table 3 and show flexural strength values compatible with those listed in Table 2. Although the average thickness of the cemented joints was 0.010 inch, cemented joint thicknesses between about 0.010 inch and about 0.035 inch would produce an excellent bond for electrode sections.

TABLE 3

Cemented Joints B' Through G'

[The flexural strength of each joint of 4 samples is expressed in pounds per square inch and cement joints B' through G', employ cement composites B through G, respectively, from Table 1]

|  | B' | C' | D' | E' | F' | G' |
|---|---|---|---|---|---|---|
| Maximum | 967 | 1,438 | 1,095 | 2,036 | 1,973 | 1,693 |
| Minimum | 560 | 859 | 649 | 1,807 | 1,413 | 1,476 |
| Average | 725 | 1,215 | 920 | 1,900 | 1,713 | 1,629 |
| Failure | (1) | (2) | (3) | (4) | (5) | (4) |

1 Joint (4 samples).
2 Joint (2 samples) Stock and Joint (2 samples).
3 Joint (3 samples), Stock and Joint (1 sample).
4 Stock (4 samples).
5 Stock (2 samples), Stock and Joint (2 samples).

EXAMPLE 3

Four 2 inch diameter sample cores, similar to those identified above, were cut to 6 inch lengths and machined with 90° flat mating end faces. A zirconium-boron cement composite, shown in Table 4, was trowelled on the end faces of the core samples. The mating flat end faces were then assembled with sufficient pressure to cause the cement to extrude around the periphery of the joint. The average thickness of the cemented joints for the four assembled core specimens was 0.010 inch.

The core specimens were placed in a hot air convection oven and heated for 16 hours at 110° C. to cure the low temperature binder. The specimens were then packed in coke and baked in an induction heated furnace at 500° C. per hour to 2,000° C. Thereafter they were cooled to room temperature and then subjected to a flexural strength test as described above.

TABLE 4

Zirconium-Boron Cement Composite (Expressed in parts by weight per 100 parts of the cement)

| Zirconium | 29.41% |
|---|---|
| Boron Amorphous | 29.41% |
| Furfural | 10.30% |
| Furfural Alcohol | 10.30% |
| Phenol Resin | 20.58% |

The maximum, minimum and average flexural strength applied to the four core specimens prior to their failure is shown in Table 5. It should be noted that each specimen failed at the stock portion of the graphite core thus demonstrating the strong cemented bond obtained from this cement composite.

TABLE 5

Zirconium-Boron Cemented Joints (Flexural strength expressed in pounds per square inch)

| Maximum | 1,739 |
|---|---|
| Minimum | 1,120 |
| Average | 1,340 |
| Failure | Stock (all 4 specimens) |

The high temperature cement of this invention can be used with nipple connected electrode joints, 45° conical end face nippleless joints, 90° flat end face nippleless joints or any other feasible geometrically shaped end face joints with or without nipple connecting means and with or without centering pins of various configurations. In addition, the cement can be used to join any carbonaceous articles required for high temperature environments and/or carbonaceous articles requiring good electrical conductivity across the joint.

What is claimed is:

1. In an electrode joint comprising two electrode sections each having an end face joined by at least a cemented bond, the improvement which comprises said cemented bond being prepared from a cement which comprises elemental powders of boron and a transition metal and a carbonizable binder, said ratio of boron to transition metal being between about 9:1 and about 1:9.

2. The electrode joint as in claim 1 wherein said cement contains at least a material selected from a group consisting of particulated carbon, silicon and oil.

3. The electrode joint as in claim 2 wherein said transition metal is titanium and wherein the boron to titanium ratio is between about 3:2 and about 2:3.

4. The electrode joint of claim 1 wherein said cemented bond is between about .005 inch and about 0.030 inch thick.

5. The electrode joint of claim 4 wherein said transition metal is titanium and wherein the boron to titanium ratio is between about 3:2 and about 2:3.

6. The electrode joint of claim 1 wherein said cemented bond contains a textile material and is between about 0.010 inch and about 0.035 inch thick.

7. The electrode joint of claim 6 wherein said transition metal is titanium and said boron to titanium ratio is between about 3:2 and about 2:3.

* * * * *